March 30, 1965     E. GÖTZ ETAL     3,175,763
APPARATUS FOR PUNCHING CODED INFORMATION INTO A TAPE
Filed March 14, 1962
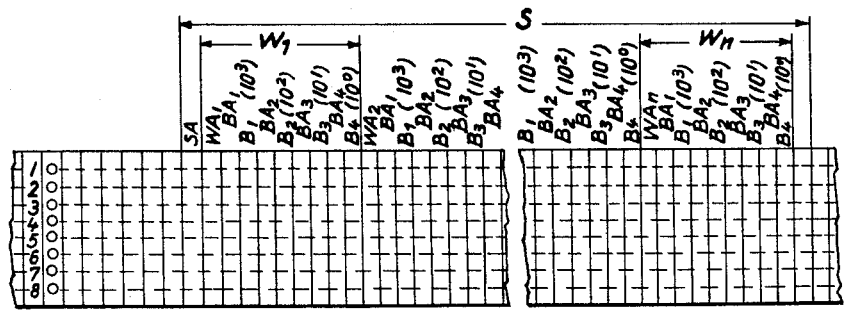
*Fig.1*
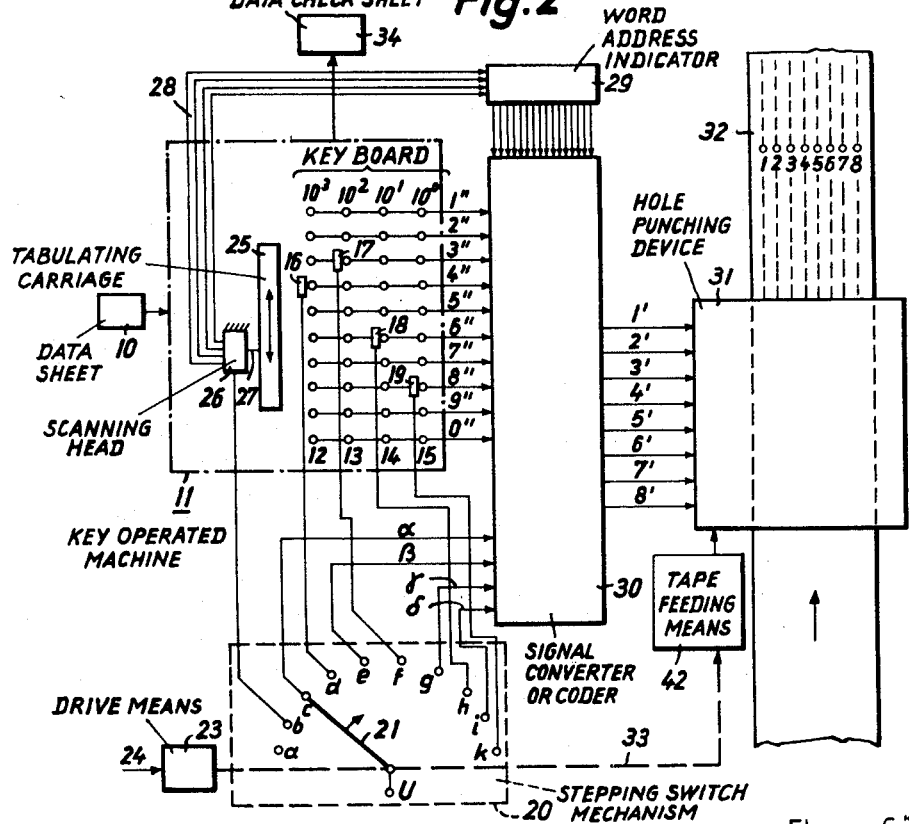
*Fig.2*
*Fig.3*
Elmar Götz
Peter Boese
Inventors
By: George H. Spencer
Attorney United States Patent Office 3,175,763
Patented Mar. 30, 1965

3,175,763
APPARATUS FOR PUNCHING CODED
INFORMATION INTO A TAPE
Elmar Götz and Peter Boese, Berlin-Frohnau, Germany,
assignors to Licentia Patent-Verwaltungs-G.m.b.H.,
Frankfurt am Main, Germany
Filed Mar. 14, 1962, Ser. No. 179,647
Claims priority, application Germany, Mar. 17, 1961,
L 38,464
3 Claims. (Cl. 234—17)

The present invention relates generally to punching and punching control methods and apparatus, and, more particularly, to punching control for the rapid punching of coded information into punch tapes for control purposes.

Modern numerically controlled processes, such as for the control of machine tools, are used with both external and internal interpolation. The important factor in this field is to guide either the tool with respect to the workpiece, or the workpiece with respect to the tool, along a fixed or accurately determined path. In such a process, the coordinates of the individual points on the path to be followed are successively preset. A control device is used to assure that the machine tool operates in accordance with these preset coordinates.

When there is numerical control using external interpolation, then the coordinates of each individual point are fed to the control mechanism, which is an independent unit. On the other hand, in the case of numerical control with internal interpolation, only certain values of the desired path, i.e., the so-called characteristic path data, are fed to the independent, complete control device. The control device then calculates the individual points of the path to be followed from the characteristic path data which have been provided.

Thus, in the case of external interpolation, the amount of information which need be fed to the control device is much larger than when there is internal interpolation. Accordingly, only magnetic tape is practical as a storage medium for this large volume of data to be processed when there is external interpolation. However, when internal interpolation is used, then punch tapes may be employed. These punch tapes are preferable to magnetic tapes since they are easier to inspect and are not susceptible to disturbances caused by foreign or external magnetic fields or the like.

With the prior art in mind, it is a main object of this invention to provide apparatus for quickly, simply, and accurately punching information from a data sheet into a perforated tape in coded form.

Another object of the present invention is to provide such apparatus which can produce these punch tapes either with or without word and/or command addresses.

These objects and others ancillary thereto are accomplished according to preferred embodiments of the invention wherein a conventional type of business or office machine, such as a calculating or accounting machine of the manually key-operated type is used and preferably one having a tabulating carriage. The commands which are represented as numerical values are read from a previously prepared data sheet and are manually keyed into the business machine. Then, the individual digits of the number which has been keyed in, are fed to a signal converter where they are binary coded and fed to a hole punching device. This is accomplished by initiating operation of an automatic stepping switch mechanism which feeds the keyed in digits successively to the signal converter. The hole punching device advances the punch tape in synchronism with the stepping switch mechanism and punches the digits into the tape in coded form.

A further feature of the invention is the provision of several rows of contacts on the tabulating carriage of the business machine. These rows are disposed one above the other and parallel to the direction of movement of the carriage, in order to provide for the punching of word addresses into the tape. The rows of contacts move past a scanning head which is provided with a number of scanning or sensing contacts so that at each stop position of the tabulating carriage the scanning contacts will or will not establish a contact depending upon the distribution of contact riders or markers on the contact rows. This arrangement is predetermined before program punching is initiated. Thus, the prearranged contact combination is sensed or read in the form of a binary coded word address during the first step of the step switching mechanism and is used for punching the word address.

According to another feature of the invention, a command address contact is disposed in front of each command digit contact of the step switching mechanism in order to handle the command addresses so that the circuits which are closed due to the command address contacts being closed, will directly affect corresponding inputs of the signal converter which then transfers punching combinations corresponding to the command addresses into the punching device proper.

Additional objects and advantages of the present invention will become apparent upon consideration of the following description when taken in conjunction with the accompanying drawings in which:

FIGURE 1 is a schematic view of a punch tape as used with the present invention.

FIGURE 2 is a schematic diagram of the circuit and mechanism to be used in accordance with the instant invention.

FIGURE 3 is a schematic view of the reverse side of the tabulating carriage.

The program contained in a punch tape is divided into individual sentences which are arranged on the punch tape in chronological order. Each sentence comprises a number of words, each of which represents a number or numerical control value which is indicative or representative of a particular magnitude which is required for the control process.

There are numerical control devices using internal interpolation which can process or determine curve paths to be followed, which curve paths may be portions or segments of straight lines and/or portions of arcs. In this case, the so-called characteristic path data are the coordinates of the initial point and the terminal or last point of the portions of the straight line and/or of the arc, as well as the coordinates of the midpoints of the arc portions. A sentence of the program is assigned to each beginning and/or terminal point of a portion of a straight line or of an arc. Such a sentence for the control of a machine tool may, for example, contain the following words:

(1) The $x$ coordinate $x_e$ of the end or terminal point of a portion of a straight line or of an arc;

(2) The $y$ coordinate $y_e$ of the end or terminal point of a portion of a straight line or of an arc;

(3), (4) The midpoint coordinates $x_m$, $y_m$ of the arc portion;

(5) An item of information concerning the tool to be used;

(6) The feeding or advancing speed;

(7) The number of revolutions or speed of rotation;

(8) An item of information as to the shape, slope, or form of the path to be followed, i.e., straight line, a circle, or arc to the right, or a circle, or arc to the left; and (9) Information concerning the operation of auxiliary components of the device being controlled, such as a machine tool. For example, this information could be the strength or pressure of a drilling oil stream for cooling and/or lubricating purposes.

A number is assigned to each word. When this information concerns the occordinates, then this number itself is the value of the coordinate. In the case of other words being used, all the desired variations thereof are successively numbered, beginning with number 1. Then, if, for example, twelve different feeding speeds are possible, the feeding speed to be used will be indicated by one of the numerals from 1 to 12.

Each of the numbers which characterizes the size of a ward may be formed of several digits. These individual digits are called commands and one word thus comprises as many commands as the number characterizing the word has digits. Each of these digits must be punched into the tape in binary coded form. Each digit may have a value of anywhere between 0 and 9, and a four position binary number is used to transform this decimal digit into a binary coded digit. On the tape itself, each command or digit is provided in a column which extends transversely of the direction of movement or of the longitudinal direction of the punch tape.

The data of a sentence which is provided on the punch tape are written into or transferred to corresponding storage means of the numerical control device from which they are withdrawn or read out for processing purposes. In order to assure that the commands of a punch tape associated with a particular word will arrive at the correct storage means of the control device, each word is provided with a word address. This word address is represented by a number which is provided in the first column of the word on the punch tape. Since the storage means for each word has a separate storage component for each digit thereof, the individual commands are also provided with command addresses.

Before programming, a data sheet is usually prepared and may, for example, be of the following design:

| Sentence Number | $x_e$ | $y_o$ | $x_m$ | $y_m$ | Tool | Feeding | Number of Revolutions | Shape of Path | Auxiliary Components |
|---|---|---|---|---|---|---|---|---|---|
| . | . | . | . | . | . | . | . | . | . |
| . | . | . | . | . | . | . | . | . | . |
| . | . | . | . | . | . | . | . | . | . |

In this data sheet, the sentences are sequentially numbered and each word has a column assigned to it in which the number characterizing the size of the word is inserted.

FIGURE 1 illustrates a portion of a punch tape as described above. This punch tape is provided with eight rows numbered from 1 to 8. These rows are indicated in the figure only by dashed lines, except for one column wherein a hole is shown in each row. Although eight rows are used, only rows 1 through 4, for example, will be used for storing the digits, while the other rows 5 through 8 are used for control and other purposes which will not be discussed in detail.

One of the four rows 5 to 8 will be used to distinguish commands and addresses. The information which is provided on the punch tape comprises successively arranged sentences. One such sentence is designated S in FIGURE 1. The first column of this sentence contains the sentence address SA. In order to simplify the description, it is assumed in FIGURE 1 that the sentence address will comprise a number between 0 and 15, inclusive, because a four position binary number of rows 1 to 4 will only permit values of up to 16 to be represented. If the sentence address requires a greater value than 16, then several columns of the punch tape will be necessary to store this information. This is also true for word addresses and for command addresses. However, the command addresses hardly ever exceed 16 position numbers. The sentence S has a sentence address SA and also includes individual words $W_1$ to $W_n$.

Assuming that the punch tape of FIGURE 1 is prepared in accordance with the data sheet discussed above, the word $W_1$ will represent the $x$ coordinate of the terminal or end point of the straight line portion or arc portion, and the word $W_n$ indicates the force or pressure of the drilling oil jet, assuming as above that this is the auxiliary component to be controlled. Each word comprises a word address WA and the commands $B_1$ to $B_4$ with their respective command addresses $BA_1$ to $BA_4$. It may thus be seen that in the present example it has been assumed that the numbers to be processed are four significant digits or four place numbers at most. Assuming that the four place number does not include any decimal values, then the first command column $B_1$ will store the thousands, the second command column $B_2$ will store the hundreds, the third command column $B_3$ will store the tens, and the fourth command column $B_4$ will store the units.

With more particular reference to FIGURE 2, an embodiment of the invention is schematically illustrated. In connection with this embodiment, the punching of word and command addresses will be considered. If one or the other or both of these are to be omitted, then the apparatus which carries out this function may be omitted from the circuit.

In the following description, it is initially assumed for the purpose of simplicity that neither word nor command addresses are to be punched into the tape. A conventional type of business machine 11 is used. Also indicated in this figure are the tabulating carriage 25 and the four rows of ten keys each providing a keyboard which is associated with the contact bars 12 to 15.

The key operated business machine is operated in accordance with data sheet 10 which has been initially prepared for the particular operation to be controlled. The tabulating carriage 25 is initially adjusted so that its entire operating length or a portion thereof is divided into a number of steps equal to the number of words which are present. These steps determine the start and stopping positions of the tabulating carriage 25 in a manner similar to the operation of a carriage of a typewriter under the tab control.

Then the operator will write in the numbers of the individual words successively in the following manner. For each individual word, all digits of the number which represents the size of the word will be keyed into the operating machine which, in this case, is assumed to be keys 16 through 19, which in FIGURE 2 is shown as the numeral 4368. A stepping switch mechanism 20 is provided which has a plurality of contacts $a$ through $k$ and of which contacts $d$, $f$, $h$, and $k$ are connected with the contacts of keys 16 through 19, respectively. Thus, upon operation of the stepping switch, a signal in the form of electrical energy will pass through these keys 16 through 19 in order to energize the numerals indicated by 4", 3", 6", and 8" of the input to the signal converter or coder 30. The stepping switch mechanism 20 is operated by drive means 23 which are set into operation by means of an input 24 which is controlled by actuating the proper key of the key operated machine. This is done after the numeral is keyed into the machine. When the machine actuating key is operated, the number which has been keyed into the machine as mentioned above is printed on the sheet which has been inserted into the key operated machine. The contacts $b$, $c$, $e$, $g$, and $i$ of the stepping switch mechanism will not be considered at this time.

A conductive connection is successively established for each keyed in digit by means of movement of the contact arm 21 of the stepping switch mechanism 20, and this causes a signal to be fed to the coder 30 by means of one of the ten conductors 1" to 0", respectively, in the manner mentioned above. In response to this signal, the coder automatically selects the proper group of its eight outputs 1' to 8' in a predetermined manner which provides the command onto the punch tape, this output being first fed to the hole punching device 31.

The outputs 1' to 4' of the coder carry digits to be punched in a binary coded form, as explained above, whereas the other four outputs 5' to 8' carry information relative to the program control operations. When output signals appear at outputs 1' to 8', and/or when these signals are changed, the punching operation of the hole punching device 31 is initiated, and the punch tape 32 advanced by one column by a tape feeding mechanism 42 associated with the hole punching device. The dashed line 33 which is connected between contact arm 21 and tape feeding means 42 indicates that whenever the stepping switch mechanism has made one step forward, this tape feeding device of the hole punching device is freed and feeds the tape one column after which it is locked so that a punching operation may be carried out, and thus a safety locking device is provided. As described above, the four digits representing the number which characterizes the size of the word are successively punched on the four columns of the punch tape. Upon completion of this punching operation the tabulating carriage is brought into position corresponding to the next following word and this is where it is punched into the tape in the same manner as the preceding word.

If the individual words are to be provided with word addresses the following operation will take place. The tabulating carriage 25 is provided with a number of contact rows on its reverse side as shown in dashed lines in FIGURE 3. They are arranged parallel to the advancing or moving direction of the carriage and are disposed one above the other. In the embodiment illustrated in FIGURE 2 it is assumed that four contact rows are present, therefore four rows are shown in FIGURE 3. A scanning head 26 is provided to scan these contact rows and it includes four scanning or sensing contacts 27 which are disposed one above the other and each is in alignment with a contact row. The scanning head 26 is stationary. A physical contact between the scanning contacts 27 and the contact rows will occur only at those places where contact markers or riders 40 are provided along a contact row. In each individual position of the tabulating carriage corresponding to a particular word, 0 to 4 contact markers are placed on the four contact rows in such a manner that the binary coded number represented by the presence and absence of these contact markers corresponds with the number representing the word address.

When the stepping switch mechanism 20 is actuated as when a word is being punched, then, when the contact b is closed the word address is first indicated at the four outputs of the scanning head 26. This word address is fed to word address indicator 29 by means of four conductors 28. The word address indicator 29 is provided with sixteen outputs, one of which will have a signal at the output which corresponds to the value of the four position binary coded number. The coder 30 is actuated by this signal and delivers at its outputs 1' to 8' one of sixteen possible word address combinations which are thereafter punched into the punch tape.

Command addresses may be provided in a simple manner. The stepping switch mechanism 20 is provided with an additional command address contact arrangement $c, e, g$, and $i$, respectively, before each digit or command contact $d, f, h, k$, respectively. The command address contacts feed signals to the signal converter 30 when the contact is closed by means of contact arm 21 and the conductors $\alpha, \beta, \gamma$, and $\delta$. The coder 30 then feeds the corresponding command address combinations from its outputs 1' to 8', to the hole punching device 31.

Frequently, words are not changed in value in long series of successive sentences. For example, the feeding value may remain constant over long lengths of the path to be followed. Such words which remain constant in their value are transferred to the punch tape only once that is, when they appear in a sentence for the first time. In all of the following sentences, they are simply omitted. This is accomplished by making the tabulating carriage skip the respective work positions.

The number of digits of all of the words will not simultaneously correspond with the greatest possible number of digits, that is, they will not all simultaneously be the maximum number of digits which are to be processed by the machine and by the stepping switch mechanism. Thus, two possibilities may be differentiated. They are:

(1) The number of a programmed word containing only a few digits may acquire a greater number of digits during the course of the program; and (2) The number of digits of a programmed word remain relatively small during the entire course of the program.

In the first case, the maximum number of digits of this word which occur at any point of the program are considered when punching the tape. On the punch tape these digit columns are to be designated 0 and are provided with command addresses which precede the digit columns. This is necessary in order to assure that in the storage means of the numerical control device, to which the program is later fed from the punch tape, 0 actually appears at all points where 0 occurs in the program and that the storage means do not continue to store the preceding value. For the sake of clarity and simplification, in the case of the higher empty digit positions, these zeros are not written on the sheet which is in the key-operated machine.

In the second case mentioned above, the higher digit positions which are those which are never used for the particular word during the course of the entire program are not considered or punched into the punch tape. This is accomplished by blocking the corresponding outputs of the stepping switch mechanism. Since the number of positions may be different for each word, this blocking is dependent upon the particular word. For example, this may be accomplished by the use of the output signals of the word address indicator 29.

The sentence address in general will represent a number which is greater than sixteen. The sentence address is punched by actuating the entire device in a similar manner as it was accomplished for punching a word. Thus, in this case also, each digit of the sentence number is provided with a command address.

A control or check of the accuracy of the numbers which are keyed into the machine by the operator after they have been read from the data sheet 10 may be accomplished if desired. This is done by inserting a data check sheet 34 into the business machine so that the information keyed into the machine is also placed onto this data sheet 34. This information must be identical to and fully correspond with the first data sheet 10 as to the content and the arrangement thereof. By adding and forming totals or sums of the individual columns and rows, as well as over the entire sheet for both data sheets, figures are obtained which may be compared. Thus, these sums must be identical as a condition for the keying to be correct, and if this condition is not met, then the numbers keyed into the machine are not accurate. The above described sum control for checking may also be accomplished by scanning the finished punch tape and by automatically arranging the scanned numbers of the same kind as they are on the data sheet 10.

It will be understood that the above description of the present invention is susceptible to various modifications, changes, and adaptations, and the same are intended to be comprehended within the meaning and range of equivalents of the appended claims.

What is claimed is:

1. A punching assembly, comprising, in combination:
   (a) a key operated business machine arranged to have numbers keyed thereinto;

(b) a coder for converting numbers into output signals in binary coded form;

(c) a stepping switch mechanism having a plurality of contacts and connecting said business machine and said coder for automatically and sequentially feeding into said coder the individual digits of numbers keyed into said business machine;

(d) a hole punching device through which a tape may be fed connected to receive the output signals from said coder for punching said numbers into a tape in binary coded form, said device including means for advancing a tape therethrough in synchronism with said stepping switch mechanism to arrange the binary coded digits on a tape in proper sequential order, said business machine including a tabulating carriage having a plurality of contact rows disposed one above the other and extending parallel to the direction of carriage movement, and a plurality of contact markers arranged on the contact rows in a manner representative of a word address;

(e) a scanning head having the same number of scanning contacts as there are rows so that said head receives information indicative of a word address; and (f) means connecting said head to the initial contact of said stepping switch mechanism and with said coder for feeding this information to said hole punching device to punch the word address into a tape in binary coded form.

2. An assembly as defined in claim 1 wherein said feeding means includes a word address indicator having an input section connected to said head and having as many outputs as there are different word addresses, said outputs being connected as the inputs to said coder to provide said hole punching device with a punching combination representative of the word address.

3. An assembly as defined in claim 1 wherein said stepping switch mechanism includes command digit contacts corresponding, respectively, to a digit of a number keyed into said machine, and a command address contact preceding each command digit contact for closing circuits which directly affect corresponding coder inputs to form punching combinations in said hole punching device corresponding to command addresses.

References Cited by the Examiner
UNITED STATES PATENTS

| | | | |
|---|---|---|---|
| 1,834,561 | 12/31 | Watson | 235—61.1 X |
| 2,473,444 | 6/49 | Rajchman | 235—159 |

MALCOLM A. MORRISON, *Primary Examiner.*

DARYL W. COOK, *Examiner.*